United States Patent [19]

Bliesner

[11] Patent Number: 5,178,348
[45] Date of Patent: Jan. 12, 1993

[54] CONTOURED WING/FLAP ASSEMBLY AND METHOD

[75] Inventor: Wayne T. Bliesner, Snohomish, Wash.

[73] Assignee: The Boeing Company, Seattle, Wash.

[21] Appl. No.: 831,408

[22] Filed: Feb. 5, 1992

[51] Int. Cl.⁵ ............................................... B64C 9/22
[52] U.S. Cl. ..................................... 244/212; 244/215; 244/213; 244/200
[58] Field of Search ............... 244/212, 215, 202, 211, 244/213, 216, 130, 200

[56] References Cited

U.S. PATENT DOCUMENTS

| | | | |
|---|---|---|---|
| 3,199,813 | 8/1965 | Roper | 244/35 R |
| 3,478,988 | 11/1969 | Roed | 244/212 |
| 3,756,540 | 9/1973 | Williams | 244/35 R |
| 3,949,956 | 4/1976 | Alvarez-Calderoa | 244/211 |
| 4,120,470 | 10/1978 | Whitener | 244/213 |
| 4,131,252 | 12/1978 | Dean et al. | 244/212 |
| 4,360,176 | 11/1982 | Brown | 244/215 |
| 4,426,054 | 1/1984 | Wang | 244/212 |
| 4,796,840 | 1/1989 | Heynatz | 244/213 |
| 4,813,631 | 3/1989 | Gratzer | 244/35 R |

FOREIGN PATENT DOCUMENTS

665964 9/1938 Fed. Rep. of Germany .

*Primary Examiner*—Galen Barefoot
*Assistant Examiner*—Christopher P. Ellis
*Attorney, Agent, or Firm*—Hughes & Multer

[57] ABSTRACT

A wing flap assembly having a contoured upper forward surface portion of the flap being arranged to reduce adverse effects of a wake producing device, such as a landing gear or a flap track faring, positioned upstream of the slot, when the flap is in its highlift slotted position. The contoured area has a moderately greater slot gap width, and relatively sharper curvature at a nose end of the contoured flap surface portion to produce a desired pressure distribution where recovery begins at a further upstream location on the flap.

20 Claims, 3 Drawing Sheets

CONTOURED WING/FLAP ASSEMBLY AND METHOD

BACKGROUND OF INVENTION

1. Field of Invention

The present invention relates to a wing/flap assembly and method for an aircraft, and more particularly to such an assembly which is designed to reduce adverse effects of wake producing devices, such as landing gear or flap track faring.

2. Background Art

Aircraft wings are commonly provided with trailing edge flaps which are positioned in a stowed position in the aft portion of the main wing for cruise, and for landing are deployed to their high lift position where the flaps form a slot with the rear portion of the wing. However, it commonly happens that the performance of the wing and trailing edge flap combination are adversely affected when a wake producing device, such as a landing gear or a flap track faring is located forwardly of the slot formed by the flap and the wing so as to produce turbulent wake flow that flows through the slot and over the upper surface of the wing.

Various solutions to this problem have been tried. One is to add a slot or slots in the flap itself so that air from beneath the flap flows upwardly through the slot formed in the flap to then flow over the upper flap surface, and thus delays the onset of separated flow. However, these added slots increase the cruise airfoil drag and have additional cost associated with the slot addition. Another technique is to add vortex generators on the flap leading edge to reduce separation in the extended position. However, it has been found that such vortex generators have minimal effect on a highly loaded flap. Yet another approach has been simply to streamline the wake producing object. While this can produce some benefit, this requires additional faring to streamline the upstream object that causes the disturbance.

A search of the patent literature has disclosed a number of patents, these being the following.

U.S. Pat. No. 4,131,252 (Dean et al) shows a wing and trailing edge flap configuration arranged to compensate for airflow blockage at the slotted area of the flap. There is a recessed area in the upper surface of the flap in the area of the blockage, and there is a slot leading from the lower surface of the flap upwardly into the rear area of the recess to provide additional air flow to compensate for the air flow blockage.

U.S. Pat. No. 3,199,813 (Roper) illustrates an airfoil pod mounted to an edge of the wing having an inner side surface aerodynamically contoured to match the direction of flow over the upper and lower surfaces of the wing.

U.S. Pat. No. 3,756,540 (Williams) shows an airfoil where there is along the chord length five sections producing specialized flow patterns over each section. At the aft end of the airfoil there is a concave region, and a tangential slot is placed at the trailing edge to produce flow over and around a Coanda profile to prevent flow separation.

U.S. Pat. No. 3,478,988 (Roed) discloses a STOL aircraft having by-pass turbojet engines where trailing edge flaps are positioned to provide various flow conditions for Stol operation and also for aerodynamic braking.

U.S. Pat. No. 4,426,054 (Wang) discloses an upper surface blown powered lift system where the jet exhaust is discharged over the upper surface of the wing, and it is deflected downwardly by the Coanda effect over the upper surface of downwardly deflected flaps for Stol aircraft operation.

German Patent No. 665,964 (a translation not being presently available) shows a trailing edge device which apparently can be deflected from an aerodynamically contoured cruise configuration to a position where the rear end of the device slants upwardly and rearwardly.

SUMMARY OF THE INVENTION

The airfoil/flap assembly of the present invention comprises a main airfoil having a leading edge portion, a trailing edge portion, an upper surface and a lower surface.

There is a trailing edge flap having a leading edge flap portion, a trailing edge flap portion, and an upper flap surface. The flap has a stowed position at the trailing edge portion of the main airfoil, and it is movable to a deployed position where an upper forward flap surface portion and the trailing edge portion of the main airfoil form a slot having a slot width dimension.

The flap has an optimized surface contour which is shaped to optimize aerodynamic performance of said flap in its stowed position and in its deployed position.

A wake generating object is positioned forwardly of the slot in a manner to produce a turbulent wake flow passing through the slot and over the upper surface of the flap at a wake flow flap location.

The upper flap surface has at the wake flow flap location a wake contoured surface area which has a first forward area portion, a second intermediate area portion and a third rear area blend portion. The upper flap surface of the optimized surface contour has at corresponding chord length location, first, second and third corresponding optimized surface region portions, respectively.

The first forward area portion has a radius of curvature which is relatively sharper than said first optimized surface region portion. The intermediate contoured area portion has a larger radius of curvature relative to curvature of the second optimized surface region portion. The second intermediate contoured area portion and the third rear contoured area portion comprise a substantially continuous aerodynamically contoured surface area.

Thus, pressure over the first forward contoured area portion is at a relatively high negative pressure and said second intermediate area portion is at a relatively low negative pressure, so that recovery of the turbulent wake flow over the wake contoured surface area begins at a relatively further forward chord length location compared to said optimized surface contour.

In the preferred configuration, there is a wake flow slot area at said wake flow flap location through which the turbulent wake flow passes, and this wake flow slot area has a slot width dimension greater than a slot width dimension formed by the optimized contour of the flap. Desirably, this wake flow slot area is between about zero to four times greater than the slot width dimension formed by the optimized surface contour of the flap, more desirably between about zero to two times as great, and in a more preferred form 1.4 to two times as great.

Also, in the preferred form, the wake contoured surface area has a forward portion having a forward spanwise dimension which is about one to two times as great as a width dimension of said wake generating object in a direction generally parallel to said spanways width dimension. More desirably, this forward spanwise width dimension is about one to two times greater.

Also, the wake contoured surface area has on opposite sides thereof blend areas that blend from the wake contoured surface area, into the optimized surface contour of the flap. Each of the blend areas is no greater than about two percent of the wing chord length of the main airfoil and the trailing edge flap in its stowed position.

In the method of the present invention, the main airfoil, trailing edge flap, and wake generating object are provided as described above. Then the upper flap surface at the wake flow flap location is provided with a wake contoured surface area as described above. In operation, pressure over the first forward contoured area portion is at a relatively high negative pressure and the second intermediate area portion has a relatively low negative pressure, as described above.

Other features will become apparent from the following detailed description.

DESCRIPTION OF THE PREFERRED EMBODIMENT

Figure 1:
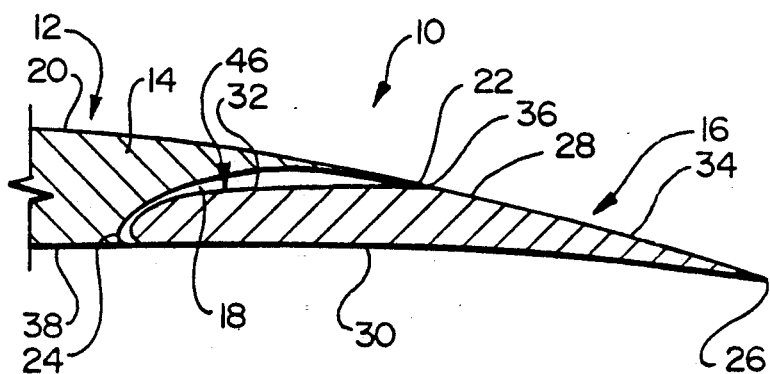
FIG. 1 is a sectional view taken along a chord-wise axis of the aft portion of the wing of an aircraft incorporating the wing/flap assembly of the present invention, with the trailing edge flap being in its stowed position for cruise.

The wing/flap assembly 10 of the present invention comprises a main wing structure 12 (only the aft portion 14 of the wing structure 12 being shown), and a tailing edge flap 16. The wing 12 is configured so that at its rear portion there is a recess or cove 18 to receive the trailing edge flap 16 in its stowed position as shown in FIG. 1. The wing 14 has an upper aerodynamic surface 20 which terminates at a rear cove edge 22.

The flap 16 has a leading edge portion 24, a trailing edge portion 26, an upper aerodynamic surface 28, and a lower aerodynamic surface 30. The upper aerodynamic flap surface 28 can (for purpose of analysis in the present invention) be considered to comprise a forward flap surface portion 32 which is that portion of the flap upper surface 28 that is positioned within the cove 18 when the flap 16 is in its stowed position of FIG. 1, and a rear flap upper surface portion 34 which is that portion of the flap upper surface portion 28 that is exposed when the flap 16 is in the stowed position of FIG. 1. The flap surface portions 32 and 34 can be considered as meeting at a juncture region 36 which in its stowed position is located immediately adjacent to the cove trailing edge 22.

When the flap 16 is in the stowed position of FIG. 1, the upper surface 20 of the main wing structure 12 forms a substantially continuous aerodynamic surface with the rear flap upper surface portion 34. Likewise, the lower flap surface 30 forms a substantially continuous aerodynamic surface with the lower surface 38 of the main wing 12.

Figure 2:
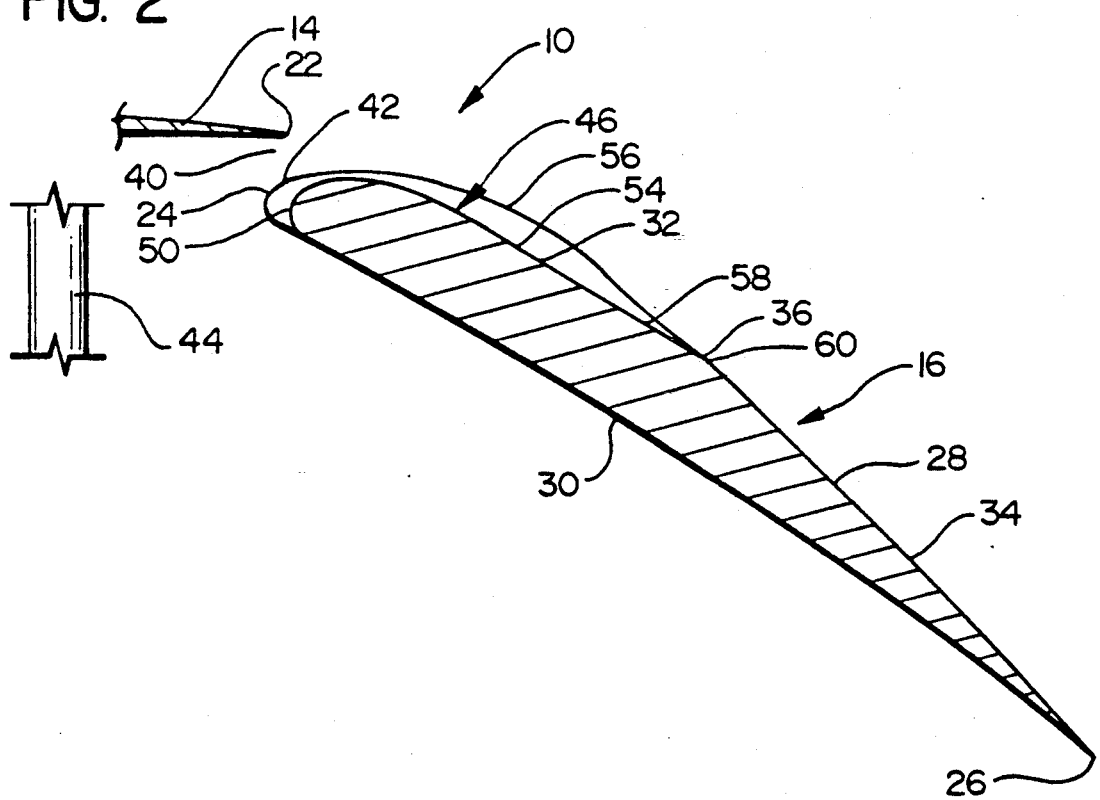
FIG. 2 is a view similar to FIG. 1, drawn to an enlarged scale, showing the flap in its deployed position and also illustrating the forward and upper surface contour wake alleviating contoured portion of the flap relative to the optimized surface contour of the flap.

When the flap 16 is moved from its stowed position of FIG. 1 to the deployed high lift position of FIG. 2, which is commonly the position for landing, the flap forms with the rear portion of the main wing 12 an aerodynamic slot 40, and the flap 16 is positioned to extend downwardly and rearwardly. While the precise positioning of the flap 16 will vary to some extent relative to the cove rear edge 22, in general, the slot forming surface portion 42 of the flap 16 (i.e. this surface portion 42 being the surface region that forms the slot 40 at its minimum width dimension) is that surface area where the surface of the leading edge portion 24 extends upwardly and rearwardly in a curve to blend in with the forward portion of the upper flap surface 28.

As indicated previously, the problem toward which the present invention is directed is that with the flap 16 in its deployed slotted position of FIG. 2, if there is an object positioned upstream of the slot 40 so as to be positioned in the flow path of the air traveling through the slot 40, then such an object can produce a turbulent wake flow that passes through the slot 40. Such a wake forming object is illustrated schematically at 44. This object 44, could be, for example, a portion of a landing gear, or possibly a faring or other object which is associated with the flap 16 and positioned in a wake creating position when the flap 16 is deployed to form the slot 40. For convenience, this object 44 is simply shown schematically.

In general, the present invention alleviates the effect of the turbulent wake flow by contouring the forward and upper surface portion of the flap 16 at the location where the turbulent wake flow passes through the slot 40 and over the upper flap surface 28 (this flap surface area adjacent to the turbulent wake flow being designated the "wake contoured surface area") so as to improve overall performance. To explain this further, reference is made to FIGS. 3A and 3B.

Figure 3A:
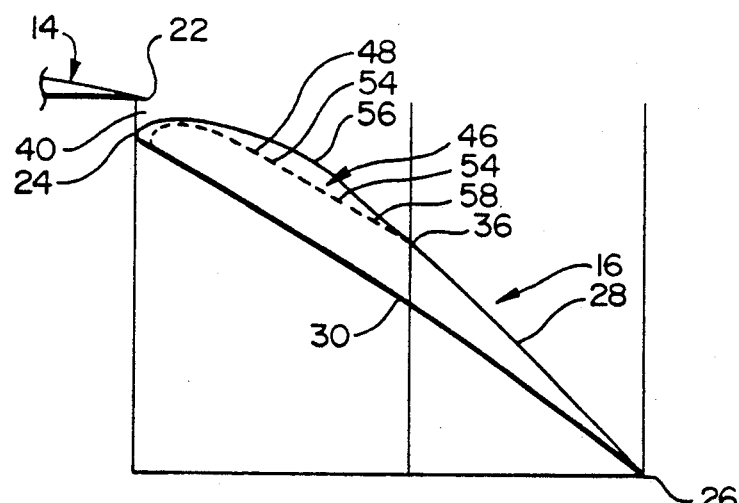
FIG. 3A is a view similar to FIG. 2, showing only the trailing edge of the main wing.

In FIG. 3A, the basic configuration of the flap 16 is shown in full lines, this basic flap configuration being the base line or optimized configuration to obtain the desired best performance in those areas where the flow through the slot 40 and over the upper surface 28 of the flap 16 is relatively undisturbed. While the configuration of this base line or optimized flap contour will vary, depending upon the particular airplane design, it would be common for the gap or slot 40 to be, for a single slotted flap, between about 1 percent to 1.4 percent of the wing chord for maximum lift at constant Alpha. Further, the surface at the leading edge of the upper surface 28 of the flap 16 having the base or optimized configuration would have a curvature so as to have more negative pressure (and thus increased lifting force) over the forward thirty to fifty percent of the upper surface 28, and then contour the upper surface 28 toward aft portion of the flap to cause recovery to occur, with separated flow likely to occur at the aft portion of the upper surface portion 28. A somewhat typical pressure distribution curve for the base line configuration is illustrated in a full line in FIG. 3B, with negative pressure being plotted vertically upward, and flap location being indicated along the horizontal axis.

Figure 7:
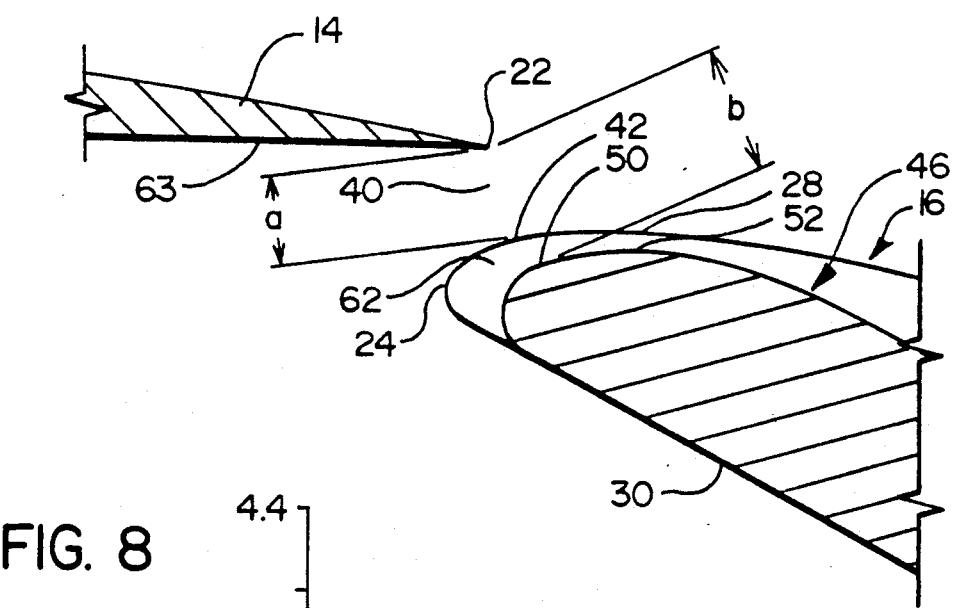
FIG. 7 is an enlarged sectional view, similar to FIG. 2, but showing only the nose portion of the flap.

The surface contour of the wake contoured surface area is generally designated 46, and this is shown by the broken line 48 in FIG. 3A. It will be noted that the slot forming forward surface portion 50 of the wake contoured surface area 46 is spaced somewhat further from the cove trailing edge 22 than is the slot forming surface portion 42 for the main baseline contour. (This is best seen in the enlarged view of FIG. 7 showing the area adjacent to the slot 40.) Further, the surface curvature at the extreme forward portion 52 (this surface portion 52 overlapping somewhat with the leading edge surface portion 50) has a relatively sharper degree of curvature than the upper surface area 28 of the baseline or optimized flap at that same chord location. It will be further noted from further examining FIG. 3B that the intermediate wake contoured surface area portion 54 that extends rearwardly from the more forward wake contoured surface portion 52 has a relatively flat configuration with very little curvature (i.e. a large radius of curvature) compared to the curvature of the upper surface portion 56 of the baseline or optimized curvature of the flap 16 at the same chord-length location. The rear surface portion 58 of the wake contoured surface area 46 remains relatively flat and then blends in at a rear blend area 60 with the contour of the rear surface portion 34 of the upper flap surface 28.

The wake contoured gap region 62 has a gap width (indicated at "b" in FIG. 7) which is moderately greater than the gap width "a" defined by the slot forming surface portion 42 with the rear cove edge 22 in the base contour portion of the flap 16. This gap width increase of the wake contoured gap area 62 relative to the gap width of the slot 40 would be about a zero to one hundred percent increase, and desirably between about twenty to fifty percent increase. To put these in terms of gap widths relative to the chord length of the wing, with the optimum slot width or gap width for a single slotted flap being between one to 1.4 percent of the wing chord, the optimized gap width at the wake contoured slot area 62 is between about 1.4 percent to 2 percent of the wing chord, depending upon the amount of blockage in front of the flap. It is possible that the percentage of gap width at the wake contoured slot area could be higher, such as up to 2 percent to 4 percent of wing chord. Further, the nose of the wake contoured area is located further rearwardly than the nose of the base configuration of the flap. It should be noted that the wing chord length is measured from a leading edge of the wing to the trailing edge of the flap 16 in the stowed position).

The increased gap width in the wake contoured slot area 62 allows a larger core flow of high velocity air in the slot area 62 which is restricted by the increased boundary layers on the lower surface 63 of the main wing 12 just forward of the cove trailing edge 22 and at the upper forward wake contoured surface portion 52.

The contouring of the forward wake contoured surface area 52 produces a pressure distribution curve having a short laminar roof top 64 (see FIG. 3B) which extends along the forward 10 to 15 percent of the flap chord. Immediately rearwardly of this, there is a turbulent recovery area 66 starting immediately downstream at approximately the location indicated at 68 and extending to the juncture region 36, and recovery continues to the trailing edge 26 of the flap 16. The laminar roof top 64 can have a slight adverse gradient to help wing loading. Experiments have indicated that there is some laminar run on the flap upper surface in this roof top area 64. The more gradual recovery aft of the roof top area 64 is to minimize the collapse of the airfoil pressure distribution on the wake contoured surface area 46 and on the flap upper surface immediately rearwardly of this contoured area 46.

Figure 3B:
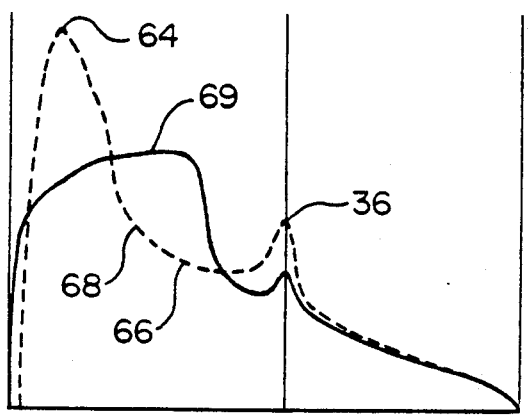
FIG. 3B is a graph coordinated and aligned vertically with FIG. 3A, showing the pressure distribution of the flow over the contoured portion of the flap's upper surface, relative to the pressure distribution over the forward and upper surface of the rest of the flap where there is not turbulent wake flow, and which has the optimized flap contour.

It will be further noted, with reference to FIG. 3B, that the pressure distribution curve 69 for the baseline contouring of the flap 16 does not peak as rapidly at the leading edge of the flap 16 as does the leading edge of the contoured flap portion 46, which has a relatively sharp gradient very early peak at 64. Rather, the pressure of the baseline pressure distribution curve 69 extends relatively flat over the first thirty to thirty five percent of chord length. Further, the baseline pressure distribution curve 69 at about fifteen percent to thirty to thirty five percent chord length is actually greater than the pressure distribution curve for the contoured area at that same chord length location. This indicates that recovery at the contoured area 46 begins at a more forward chord length location than the base flap configuration.

In general, it is desired to keep the chord length of the peak negative pressure area 64 in the wake contoured area as far forward as possible and to begin the more gradual pressure recovery toward ambient pressure earlier and in a more gradual slope. This allows for the unsteadiness in the turbulent wake flow by not having a large gradient near the shifting separation point.

Figure 4:
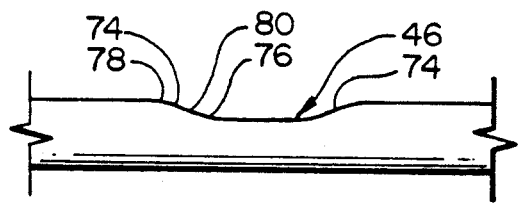
FIG. 4 is a front view of a portion of the flap where the wake alleviating contoured portion is located.
Figure 5:
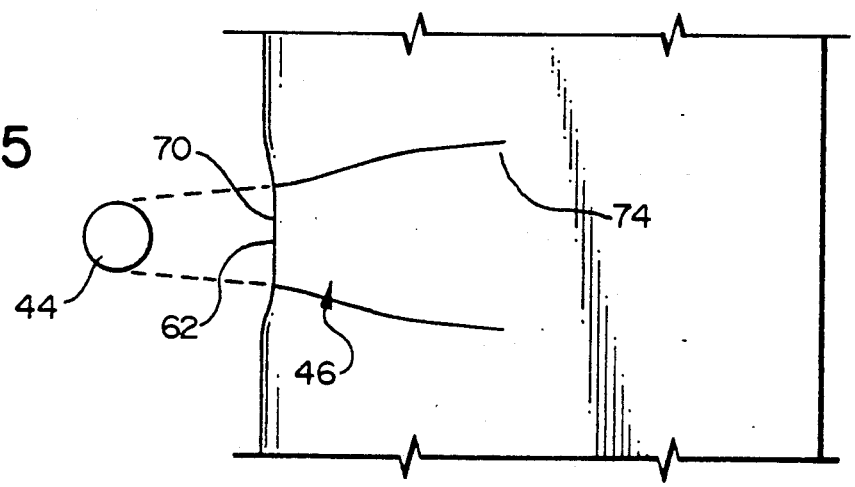
FIG. 5 is a top plan view of the portion of the flap shown in FIG. 5.

With regard to the span-wise dimension of the wake contoured surface area 46, this will be discussed with reference to FIGS. 4 and 5. The dimension of the turbulent wake flow 70 (as shown in FIG. 5) is at a location immediately downstream of the wake forming object 44 about 1 to 2 times (and desirably between 1 to 1.2 times) the width of the object 44. Further downstream, the width of the wake flow broadens. There is on each side of the wake contoured surface area 46 a blend region 74, with the two blend regions interconnecting the wake contoured surface area 46 with the adjacent surface areas of the upper flap surfaces 28. It can be seen that there are inner and outer blended areas 76 and 78, interconnected by an intermediate sloped blend area 80. In general, the width of the wake contoured surface area 46 will be moderately greater than the width of the wake forming object 44, with the width of the area 46 increasing somewhat the further forward the wake forming object 44 is from the slot 40. The span-wise dimension (i.e. the width dimension) of each blend area 74 is between about zero and 2 percent of the wing chord length.

It will be noted that with reference to FIG. 1 that when the flap 16 is moved to its stowed position, the entire wake contoured surface area 46 is concealed in the cove area 18. The rear blend or junction region 36 is positioned adjacent to the cove rear edge 22 so that the upper surface area of the flap 16 immediately aft of the wake contoured surface area 46 is substantially the same as the adjacent aft upper surface area 34.

Another consideration is how to contour the wake contoured surface area 46 if the flap 16 is required to seal against the cove trailing edge 22 during take-off. In this case, it may be desirable to move the rear blend area 60 forwardly so as to minimize drag on take-off. If the flap 16 forms a slot or gap when positioned for take-off, then that location of the wake contoured surface area 46 that is adjacent to the cove rear edge 22 in the take-off position should be properly positioned and contoured to form the proper wake contoured slot area for the take-off position.

Further, it should be noted that the location of the rear blend region 60 can be varied significantly by increasing the local nose radius at the leading edge surface portion of the wake contoured surface area 46 so as to effectively raise the overall height of the wake contoured surface 46, thus moving the blending location 60 to a more forward location. This may help to optimize the width dimension of the gap at the wake contoured area 46 for both the take-off and landing position of the flap 16 and still maintain the more forward recovery over the wake contoured surface area 46.

If the flap 16 is a vane main or double slotted flap, then the flap 16 on which the wake contoured surface area 46 is placed would desirably be at least the rearmost flap. A possible combination would be to provide the wake contoured surface area for each of the flap elements.

To summarize the operation of the present invention, in the cruise configuration, the flap 16 is stowed within the cove area 18 so that the upper aft flap surface portion 34 and lower flap surface are substantially aerodynamic extensions of the upper and lower main wing surfaces 20 and 38, respectively. The wake contoured surface area 46 is entirely concealed within the cove area 18.

For landing, the flap 16 is moved to its fully deployed high lift position, as shown in FIG. 2, with the slot 40 being formed. A wake forming object 44 (e.g. a portion of the landing gear or possibly a fairing for the flap track) is positioned in the flow field passing through the slot 40, with this object 44 producing the turbulent wake flow that passes through the slot 40.

The wake contoured area 46 is positioned so that the turbulent wake flow passes over this surface area 46. The turbulent wake contoured slot area 62 has the slot width widened relative to the width of the slot 40 for the main portion of the flap 16 (i.e. the optimized or base contoured flap portion), so as to accommodate the increased boundary layers in that area. There is a very sharp negative pressure increase at the forward surface portion 52 of the wake contoured surface area 46 due to the relatively sharp curvature in that area. Immediately after that in the intermediate wake contoured surface area 54 the degree of curvature is much less (i.e. more flat) so that recovery begins at a further upstream location (i.e. desirably between zero to fifteen percent aft of the forwardmost location of the chord length of the flap 16), and recovery proceeds more gradually toward the rear blend location 60.

Figure 6:
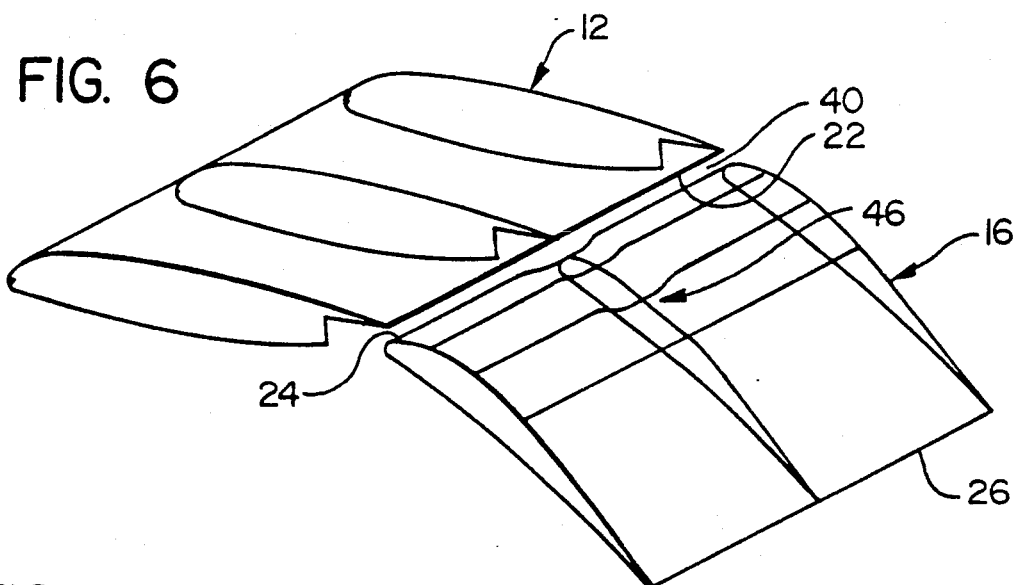
FIG. 6 is an isometric view of the wing/flap assembly, showing only that portion where the wake alleviating contoured portion is located.
Figure 8:
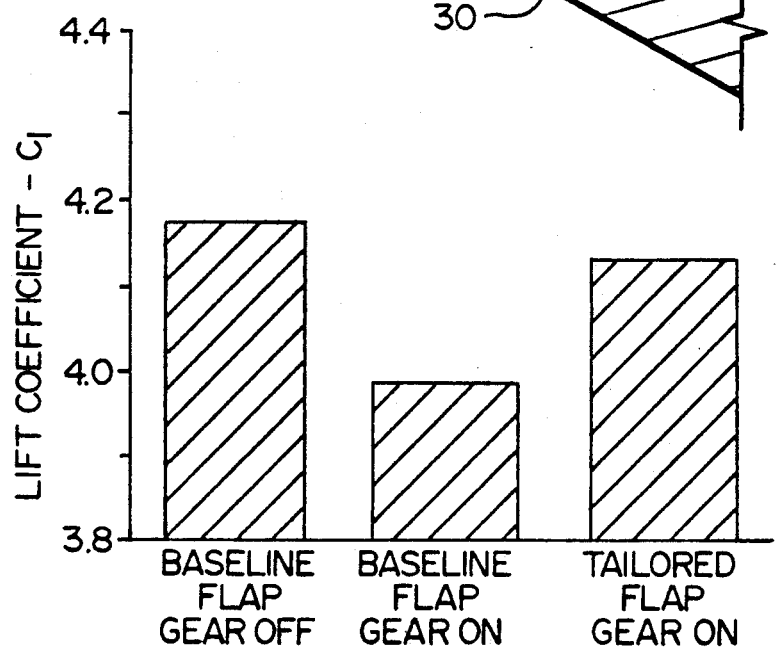
FIG. 8 is a graph illustrating performance improvement of the present invention.

The present invention was tested in a wind tunnel, and there was constructed a baseline optimized flap which was positioned in its high lift location relative to a main wing without any wake producing object, and a lift coefficient of nearly 4.2 was achieved. The results are shown in FIG. 6. Then this same baseline flap was tested with an object simulating a landing gear placed upstream of the slot defined by the flap with the trailing edge of the main wing, but with no contoured area 46. It can be seen that the lift coefficient dropped the level slightly below 4.0. Then a modified flap was positioned aft of the wing, as shown in FIG. 6, with the wake contoured surface area as described in the present invention, and it can be seen from the graph of FIG. 8 that nearly the same lift coefficient was achieved as with the baseline flap with no landing gear simulated object.

It is recognized that various modifications could be made in the present invention without departing the basic teachings thereof.

What is claimed is

1. An airfoil flap assembly comprising:
  a. a main airfoil having a leading edge portion, a trailing edge portion, an upper surface and a lower surface;
  b. a trailing edge flap having a leading edge flap portion, a trailing edge flap portion, and an upper flap surface, said flap having a stowed position at the trailing edge portion of the main airfoil, and being moveable to a deployed position where an upper forward flap surface portion and the trailing edge portion of the main airfoil form a slot having a slot width dimension;
  c. said flap having an optimized surface contour which is shaped to optimize aerodynamic performance of said flap in its stowed position and its deployed position;
  d. a wake generating object positioned forwardly of said slot in a manner to produce a turbulent wake flow passing through said slot and over the upper surface of the flap at a wake flow flap location;
  e. said upper flap surface having at said wake flow flap location a wake contoured surface area which has a first forward area portion, a second intermediate area portion and a third rear area blend portion, and the upper flap surface of the optimized surface contour has at corresponding chord length locations, respectively, first, second and third corresponding optimized surface region portions;
  f. said first forward area portion having a radius of curvature, which is relatively sharper than said first optimized surface region portion;
  g. said intermediate contoured area portion having a larger radius of curvature relative to curvature of the second optimized surface region portion,
  h. said second intermediate contoured area portion and said third rear contoured area portion comprising a substantially continuous aerodynamically contoured surface area whereby pressure over said first forward contoured area portion is at a relatively high negative pressure and said second intermediate area portion is at a relatively low negative pressure, so that recovery of the turbulent wake flow over said wake contoured surface area begins at a relatively further forward chord length location compared to said optimized surface contour.

2. The assembly as recited in claim 1, wherein there is a wake flow slot area at said wake flow flap location through which said turbulent wake flow passes, said wake flow slot area having a slot width dimension greater than a slot width dimension formed by the optimized surface contour of said flap.

3. The assembly as recited in claim 2, wherein the slot width dimension of the wake flow slot area is between about zero to four times greater than the slot width dimension formed by the optimized surface contour of said flap.

4. The assembly as recited in claim 3, wherein said slot width dimension of the wake flow area is zero to two times as great as the slot width dimension formed by the optimized surface contour of said flap.

5. The assembly as recited in claim 4, wherein the slot width dimension of the wake flow slot area is between 1.4 to two times as great as the slot width dimension formed by the optimized surface contour of the flap.

6. The assembly as recited in claim 1, wherein said wake contoured surface area has a forward portion having a forward spanwise dimension which is about one to two times as great as a width dimension of said wake generating object in a direction generally parallel to said spanwise width dimension.

7. The assembly as recited in claim 6, wherein said forward spanwise width dimension is about one to 1.2 times greater than the width dimension than the wake generating object.

8. The assembly as recited in claim 1, wherein said wake contoured surface area has on opposite sides thereof blend areas that blend from the wake contoured surface area into the optimized surface contour of the flap, each of said blend areas being no greater than about two percent of a wing chord length of said main airfoil and said trailing edge flap in its stowed position.

9. The assembly as recited in claim 1, wherein with the flap in its stowed position, the wake contoured surface area is aerodynamically sealed within the trailing edge portion of said main airfoil.

10. The assembly as recited in claim 9, wherein said wake contoured surface area has a forward portion having a forward spanwise dimension which is about one to two times as great as a width dimension of said wake generating object in a direction generally parallel to said spanwise width dimension.

11. The assembly as recited in claim 10, wherein said forward spanwise width dimension is about one to 1.2 times greater than the width dimension than the wake generating object.

12. The assembly as recited in claim 9, wherein said wake contoured surface area has on opposite sides thereof blend areas that blend from the wake contoured surface area into the optimized surface contour of the flap, each of said blend areas being between no greater than about two percent of a wing chord length of said main airfoil and said trailing edge flap in its stowed position.

13. The assembly as recited in claim 9, wherein there is a wake flow slot area at said wake flow flap location through which said turbulent wake flow passes, said wake flow slot area having a slot width dimension greater than a slot width dimension formed by the optimized surface contour of said flap.

14. The assembly as recited in claim 13, wherein the slot width dimension of the wake flow slot area is between about zero to four times greater than the slot width dimension formed by the optimized surface contour of said flap.

15. The assembly as recited in claim 14, wherein said slot width dimension of the wake flow area is zero to two times as great as the slot width dimension formed by the optimized surface contour of said flap.

16. The assembly as recited in claim 15, wherein the slot width dimension of the wake flow slot area is between 1.4 to two times as great as the slot width dimension formed by the optimized surface contour of the flap.

17. A method of improving performance in an airfoil flap assembly, where there is
   a. a main airfoil having a leading edge portion, a trailing edge portion, an upper surface and a lower surface;
   b. a trailing edge flap having a leading edge flap portion, a trailing edge flap portion, and an upper flap surface, said flap having a stowed position at the trailing edge portion of the main airfoil, and being moveable to a deployed position where an upper forward flap surface portion and the trailing edge portion of the main airfoil form a slot having a slot width dimension, said flap having an optimized surface contour which is shaped to optimize aerodynamic performance of said flap in its stowed position and its deployed position;
   c. a wake generating object positioned forwardly of said slot in a manner to produce a turbulent wake flow passing through said slot and over the upper surface of the flap at a wake flow flap location;
said method comprising:
   a. providing at said upper flap surface at said wake flow flap location a wake contoured surface area which has a first forward area portion, a second intermediate area portion and a third rear area blend portion, and the upper flap surface of the optimized surface contour has at corresponding chord length locations, respectively, first, second and third corresponding optimized surface region portions.,
   b. providing at said first forward area portion a radius of curvature which is relatively sharper than said first optimized surface region portion;
   c. providing at said intermediate contoured area portion a larger radius of curvature relative to curvature of the second optimized surface region portion, with said second intermediate contoured area portion and said third rear contoured area portion comprising a substantially continuous aerodynamically contoured surface area
whereby pressure over said first forward contoured area portion is at a relatively high negative pressure and said second intermediate area portion is at a relatively low negative pressure, so that recovery of the turbulent wake flow over said wake contoured surface area begins at a relatively further forward chord length location compared to said optimized surface contour.

18. The method as recited in claim 17, wherein there is a wake flow slot area at said wake flow flap location through which said turbulent wake flow passes, said wake flow slot area having a slot width dimension greater than a slot width dimension formed by the optimized surface contour of said flap.

19. The method as recited in claim 18, wherein the slot width dimension of the wake flow slot area is between about zero to four times greater than the slot width dimension formed by the optimized surface contour of said flap.

20. The assembly as recited in claim 17, wherein with the flap in its stowed position, the wake contoured surface area is aerodynamically sealed within the rear portion of said main airfoil.

* * * * *